US007127912B2

(12) United States Patent
Holley, Jr.

(10) Patent No.: US 7,127,912 B2
(45) Date of Patent: Oct. 31, 2006

(54) MULTI-CHAMBERED CONTAINER WITH COLLARED O-RING

(75) Inventor: James W. Holley, Jr., Colorado Springs, CO (US)

(73) Assignee: Insta-mix, Inc., Subsidiary A, Colorado Springs, CO (US)

( * ) Notice: Subject to any disclaimer, the term of this patent is extended or adjusted under 35 U.S.C. 154(b) by 417 days.

(21) Appl. No.: 10/339,855

(22) Filed: Jan. 10, 2003

(65) Prior Publication Data

US 2004/0134222 A1 Jul. 15, 2004

(51) Int. Cl.
*F25D 3/08* (2006.01)
*F16K 31/44* (2006.01)

(52) U.S. Cl. .................... 62/457.3; 215/11.4; 220/509; 251/352; 277/574

(58) Field of Classification Search .................... 62/60, 62/457.3–457.8; 215/11.4; 220/500, 501, 220/509; 206/299; 251/352, 900; 277/572–574
See application file for complete search history.

(56) References Cited

U.S. PATENT DOCUMENTS 1,498,367 A * 6/1924 Ferguson ............... 137/625.24
1,914,736 A * 6/1933 Coutu ........................ 285/271
3,106,406 A * 10/1963 Liebig ........................ 277/546
3,704,803 A 12/1972 Ponder
4,545,491 A 10/1985 Bisgaard et al.
4,779,763 A * 10/1988 Klawitter ..................... 222/80
4,865,207 A 9/1989 Joyner et al.
4,869,381 A 9/1989 Agner
4,981,022 A * 1/1991 Snyder ...................... 62/457.3
5,244,122 A 9/1993 Botts
5,247,798 A * 9/1993 Collard, Jr. .................. 62/3.62
5,423,557 A * 6/1995 De Villepoix et al. ...... 277/554
5,467,877 A 11/1995 Smith
5,555,741 A 9/1996 Oakley
5,678,709 A * 10/1997 Holley et al. ............. 215/11.4
5,685,447 A 11/1997 Springett et al.
5,692,627 A 12/1997 Feng
6,123,065 A 9/2000 Teglbjarg
6,134,894 A 10/2000 Searle et al.
6,273,299 B1 * 8/2001 Hernowitz et al. ......... 222/192
6,533,113 B1 * 3/2003 Moscovitz .................. 206/222
6,598,418 B1 * 7/2003 Holley, Jr. ................. 62/457.3
6,641,141 B1 * 11/2003 Schroeder ................... 277/552
2003/0041618 A1 3/2003 Holley, Jr.

* cited by examiner

*Primary Examiner*—William E. Tapolcai
(74) *Attorney, Agent, or Firm*—Bever, Hoffman & Harms, LLP; Patrick T. Bever

(57) ABSTRACT

A modified multi-chambered container including a container body defining a central (e.g., liquid) chamber, a neck defining an opening to the central chamber, a flange extending upward from the neck, and a groove formed in the neck around the first opening. A collared O-ring includes an annular base mounted in the groove, and a ring-shaped collar extending from an upper portion of the base toward the opening. A hollow ball member is mounted on the neck such that an outer wall of the ball member contacts the O-ring collar. A housing is attached to the container body that pushes the ball member against the collared O-ring.

17 Claims, 3 Drawing Sheets

MULTI-CHAMBERED CONTAINER WITH COLLARED O-RING

FIELD OF THE INVENTION

The present invention relates to multi-chambered containers that facilitate selective mixing of two substances stored in separate chambers of the container.

RELATED ART

U.S. Pat. No. 5,678,709 and U.S. patent application Ser. No. 09/942,073, both of which being owned by the assignee of the present invention and being incorporated herein by reference in their entirety, disclose multi-chambered substance containment apparatus that include a container body for storing a first substance (e.g., a liquid such as water, milk, or juice) and a hollow member for storing a second substance (e.g., a powdered nutritional and dietary supplements). The hollow member is selectively rotatable between a "closed" position, in which a wall of the hollow member blocks an opening into the container body such that the two substances are separated from each other, and an "open position", in which an opening in the hollow member is aligned with the opening in the container body to facilitate mixing of the two substances.

FIG. 1 is a cross-sectional view showing a multi-chambered beverage container 100 similar to that disclosed in the co-owned references cited above. Multi-chambered container 100 includes a substantially cylindrical container body 110, a detachable lower cap 120, a dome-shaped housing 130, a hollow ball member 140 having an upper neck portion extending through an opening provided in housing 130, and a detachable upper cap 150 mounted on the upper neck portion.

Referring to FIG. 1, container body 110 includes an upper end connected to housing 130, and a lower end connected to lower cap 120. In particular, container body 110 includes an outer wall having a threaded lower end 113 that defines a lower opening 114 communicating with a central chamber 115. Located at the upper end of wall 112 is a neck 116 having a flange 117 mounted thereon that defines an upper opening 118. A set of threads 119 is formed on wall 112 below neck 116.

Lower cap 120 includes a cylindrical outer wall 112 that has threads for detachable connection with threaded lower end 113 of body 110. Lower cap 120 also includes a disk-shaped cover plate 124 that covers lower opening 114 of body 110, and a cooling/mixing assembly 200 mounted on an inner surface 125 of disk-shaped cover plate 124 such that cooling/mixing assembly 200 extends into central chamber 115 of body 110. Cooling/mixing assembly 200 includes an elongated cooling element 210 and a star-like mixing fixture 220 located at an end thereof.

Housing 130 includes an outer wall 132 having threads 133 provided at a lower end thereof, and a domed or curved upper portion 134. Housing 130 defines an interior portion 135 for holding hollow ball member 140 against flange 117 of body 110. An upper opening 136 is formed in curved upper portion 134 that includes a slot through which extends the neck portion of hollow ball member 140. This slot facilitates rotation of hollow ball member 140 relative to housing 130 between the open position shown in FIG. 1, and the closed position shown, for example, in FIG. 2(A).

Hollow ball member 140 includes a spherical (curved) wall 142 and cylindrical neck portion 144 extending from and upper end thereof. Hollow ball member 140 defines a second (e.g., powder) chamber 145 that is used to store, for example, powdered nutritional or dietary substances (not shown). Spherical wall 142 defines a lower opening 147, and cylindrical neck portion 144 defines an upper opening 149 for communicating with powder chamber 145. Upper cap 150 mounts on neck portion 144 to selectively cover upper opening 149. As mentioned above, when housing 130 is loosely connected to body 110, hollow ball member 140 is rotatable relative to body 110 and housing 130 between the open position shown in FIG. 1, and the closed position shown, for example, in FIG. 2(A). In the closed position (FIG. 2 (A)), a portion of spherical wall 142 blocks opening 118 of body 110, thereby preventing a substance located inside powder chamber 145 from mixing with a substance stored in central chamber 115 of body 110. When rotated into the open position (FIG. 1), lower opening 147 aligns with upper opening 118, thereby allowing these two substances to mix freely.

FIG. 2(A) is a simplified cross-sectional side view showing a portion of multi-chambered beverage container 100 in additional detail. In particular, FIG. 2(A) shows the upper portion of body 110, the upper portion of housing member 130, and ball member 140 when ball member 140 is in the closed position. Low-cost plastic molding techniques are typically utilized to form the various parts of beverage containers, such as multi-chambered beverage container 100. These molding techniques often produce parts having slight variations from specified part dimensions due, for example, to different cooling rates and slight variations in plastic composition. To account for these minor molding flaws, multi-chambered beverage container 100 includes a groove 230 formed at the upper portion of neck 116 that holds a conventional "donut-shaped" O-ring 235. When ball member 140 is rotated into the closed position (as shown in FIG. 2(A)) and the housing (not shown) is tightened (i.e., screwed against body 110), ball member 140 is guided by flanges 117 and presses against the upper portion of conventional O-ring 235, thereby sealing powder chamber 145 of ball member 140 from central chamber 115 of body 110.

A problem with conventional multi-chambered beverage container 100 arises when molding flaws associated with multi-chambered beverage container 100 prevent O-ring 235 from sealing central chamber 115 from powder chamber 145. For example, as shown in FIG. 2(B), body 110 may be erroneously molded such that groove 230A is too deep, thereby causing ball member 140 to abut flange 117 (i.e., instead of O-ring 235). As indicated, this plastic-to-plastic contact can result in gaps that allow undesirable leakage of fluid F from central chamber 115 into powder chamber 145. FIG. 2(C) shows a second example where groove 230 is properly formed, but the opening 117 formed by neck 116 is too wide (or ball member 140 is too small). When this mismatch occurs, ball member 140 may be pressed against one section of O-ring 235 by housing 130, thereby resulting in a gap that permits fluid F to leak from central chamber 115 into powder chamber 145. Multi-chambered beverage containers 100 that are formed with these molding flaws must be discarded, thereby reducing manufacturing yields and increasing the overall cost of manufacturing these containers.

What is needed is a modified multi-chambered beverage container that avoids the leakage problems associated with minor molding flaws, thereby increasing manufacturing yields and reducing manufacturing costs.

SUMMARY

The present invention is directed to a modified multi-chambered beverage container including a collared O-ring arrangement that avoids the problems associated with multi-chambered containers that use conventional "donut-shaped" O-rings. Similar to conventional multi-chambered containers, the modified multi-chambered beverage container includes a container body defining a central chamber, a neck defining an opening to the central chamber, and a groove formed in the neck around the first opening. The collared O-ring includes a substantially "donut-shaped" (annular) base surrounding a central opening, and a ring-shaped collar extending from an upper portion of the base toward the central opening. When the collared O-ring is mounted on the container body of the beverage container, the base of the O-ring is received in the groove formed in the neck, and the collar extends out of the groove (e.g., over an inner wall forming one side of the groove) toward the openings defined by the O-ring and the neck of the container body. The multi-chambered beverage container also includes a hollow ball member that is mounted on the neck of the container body such that a spherical (curved) outer wall of the ball member contacts the O-ring collar. The collared O-ring provides a two-part seal for preventing leakage of fluid from the container body: a relatively soft seal provided by the collar that seats against the ball member in response to a relatively small amount of pressure, and a hard seal provided by the base when the ball member is firmly pressed against the O-ring. Moreover, the collar prevents the base of the O-ring from being inserted too deeply into the groove, and the collar provides a large, soft surface area that reliably seals the central chamber from the ball member in the event of minor molding flaws. Accordingly, the present invention avoids the leakage problems associated with conventional O-ring arrangements in the event of minor molding flaws, thereby increasing manufacturing yields and reducing overall manufacturing costs.

The present invention will be more fully understood in view of the following description and drawings.

DETAILED DESCRIPTION

Figure 1:
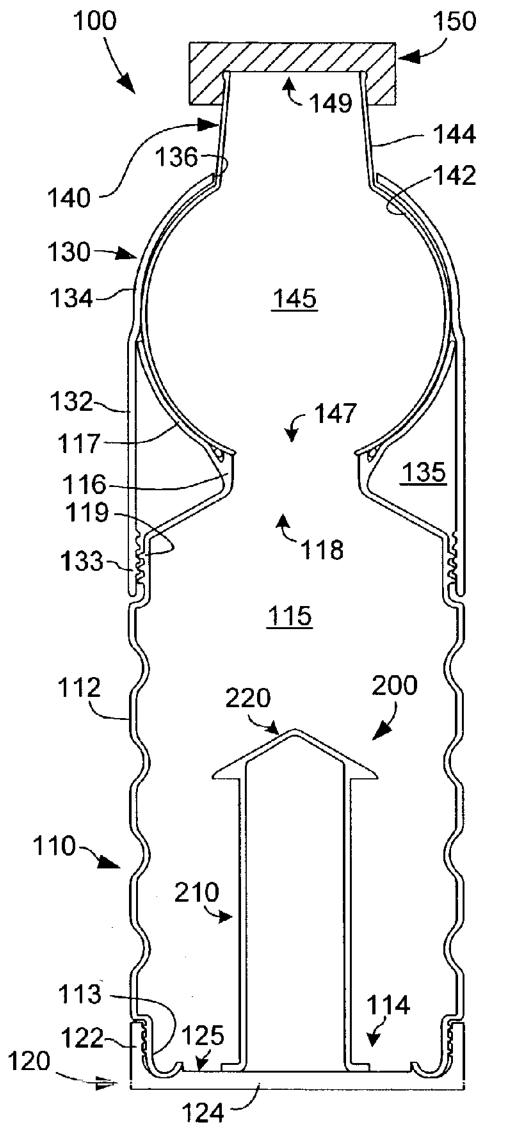
FIG. 1 (PRIOR ART)
FIG. 1 is a cross-sectional side view showing a conventional multi-chambered beverage container.
Figure 2A:
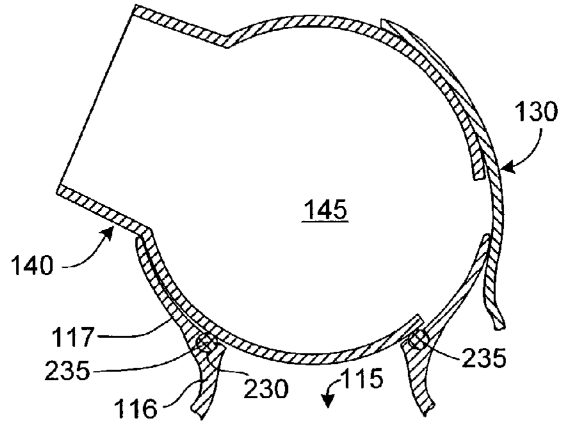
FIG. 2(A) (PRIOR ART)
FIGS. 2(A), 2(B), and 2(C) are cross-sectional side views showing a portion of the conventional multi-chambered container of FIG. 1.
Figure 2B:
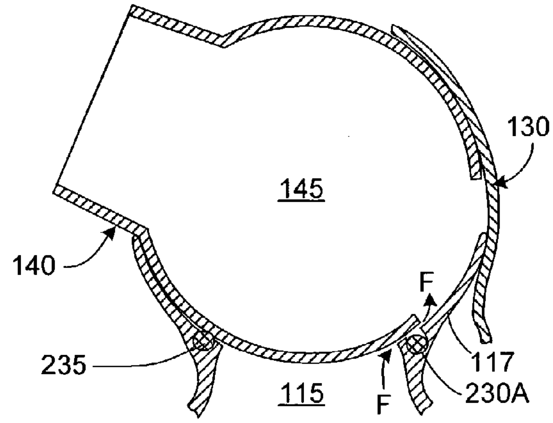
FIG. 2(B) (PRIOR ART)
Figure 2C:
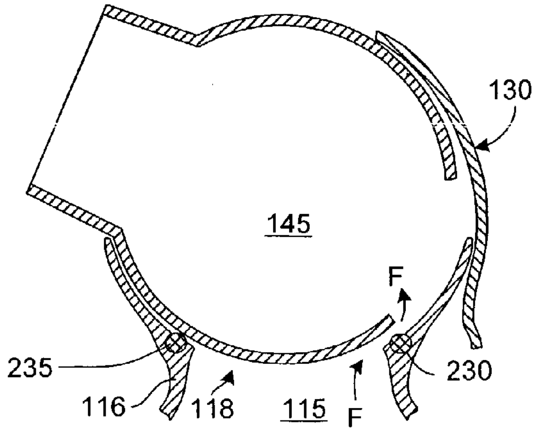
FIG. 2(C) (PRIOR ART)
Figure 3:
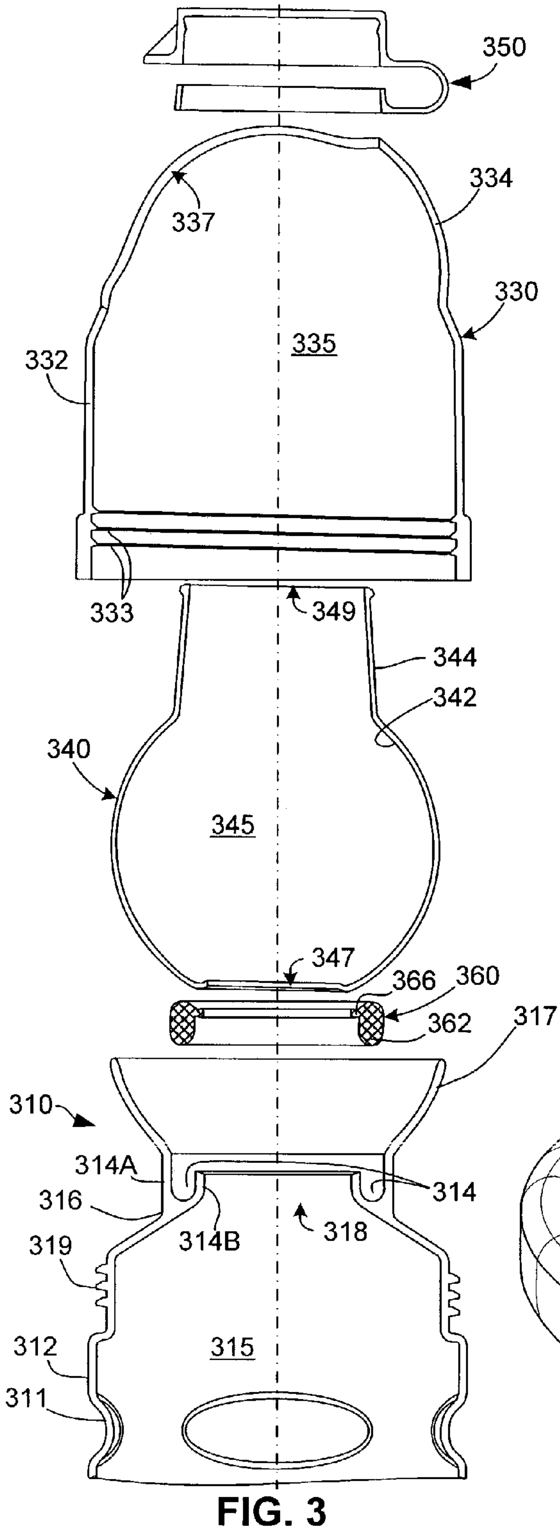
FIG. 3 is an exploded cross-sectional view showing portions of a multi-chambered beverage container according to an embodiment of the present invention.
Figure 4:
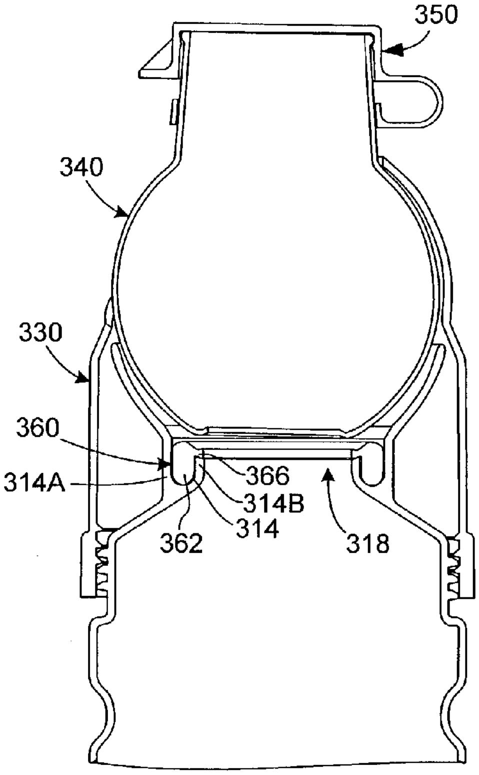
FIG. 4 is a cross-sectional view showing the multi-chambered beverage container of FIG. 3 in an assembled "open" position.

FIGS. 3 and 4 are exploded and cross-sectional views and showing a multi-chambered beverage container 300 according to an embodiment of the present invention. Multi-chambered beverage container 300 includes a substantially cylindrical container body 310 (partially shown), a dome-shaped housing 330 connected to an upper end of container body 310, a hollow ball member 340 mounted in housing 330 and having an upper neck portion extending through a slot 337 formed in housing 330, a detachable upper cap 350 mounted on the upper neck portion of ball member 340, and a collared O-ring 360.

Referring to the lower portion of FIG. 3, container body 310 includes an outer wall 312 defining a central chamber 315 in a manner similar to that described above with reference to conventional multi-chambered beverage container 100. Integrally molded at the upper end of container body 310 is a neck structure 316 that defines an annular O-ring groove 314 having an outer wall 314A and an inner wall 314B. A flange 317 extends from an upper edge of outer wall 314A. Inner wall 314B defines (surrounds) an opening 318 that communicates with central chamber 315. Outer wall 312 is formed with a series of optional indentations 311 to facilitate handling. A set of threads 319 is formed on wall 312 below neck 316. As set forth below, in one embodiment central chamber 315 is utilized to store a liquid (not shown) prior to a mixing with a powdered substance.

Housing 330 includes an outer wall 332 having threads 333 provided at a lower end thereof, and a domed or curved upper portion 334. Housing 330 defines an interior portion 335 for holding ball member 340 against flange 317 of container body 310. Slot (opening) 337 is formed in curved upper portion 334, which allows ball member 340 to rotate relative to housing 330 in the manner described above with reference to conventional multi-chambered beverage container 100.

Hollow ball member 340 includes a spherical (curved) wall 342 and a cylindrical neck portion 344 extending from and upper end thereof. Hollow ball member 340 defined a powder (second) chamber 345 that is used to store, for example, powdered nutritional or dietary substances (not shown). Spherical wall 342 defines a lower opening 347, and cylindrical neck portion 344 defines an upper opening 349 for communicating with powder chamber 345. As indicated in FIG. 4, upper cap 350 mounts on neck 344 to selectively cover upper opening 349 of ball member 340.

Container body 310, housing 330, and ball member 340 are molded from a plastic that is strong enough to withstand the biasing pressure when the apparatus is assembled in the manner shown in FIG. 4 such that housing 330 biases ball member 340 against flange 317 of container body 310. Further, the preferred plastic is Food and Drug Administration approved for food storage, exhibits sufficient lubricity for smooth sliding without the need for lubricants, and is not structurally or chemically altered when subjected to cleaning temperatures of up to 100° C. Several plastic materials are currently available which can be modified using known methods to meet the preferred characteristics discussed above, such as polyethylene, polypropylene, and polycarbonate. Combinations of these materials can also be used (e.g., container body 310 and housing 330 formed using polycarbonate, and ball member 340 formed using polypropylene). Cap 350 is molded, for example, using a somewhat softer plastic material according to known techniques.

Figure 5:
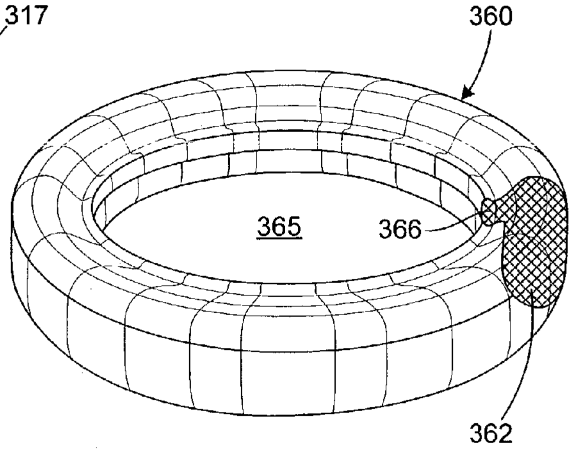
FIG. 5 is a perspective view showing a collared O-ring utilized in the multi-chambered beverage container of FIG. 3 according to a specific embodiment of the present invention.

FIG. 5 is a perspective view showing collared O-ring 360. In accordance with the present invention, as indicated by the cross-section shown in FIG. 5, O-ring 360 includes a substantially "donut-shaped" base 362 surrounding a central opening 365, and a ring-shaped collar (flange) 366 extending from an upper portion of base 362 toward central opening 365. O-ring 360 is molded from a soft, flexible, impermeable material such as silicone using known methods. As indicated in FIG. 4, when mounted onto container body 310 of beverage container 300, base 362 is received in groove 314 such that collar 366 extends over inner wall 314B toward opening 318.

Figure 6:
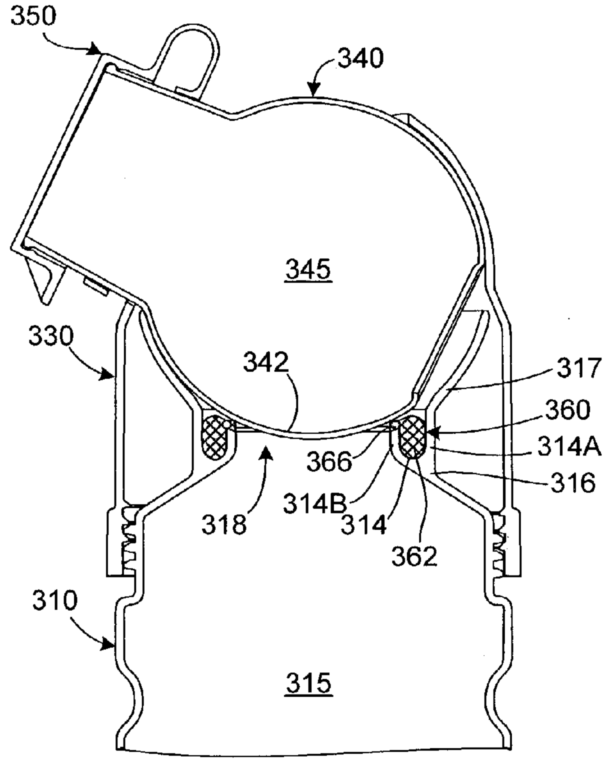
FIG. 6 is a cross-sectional view showing the multi-chambered beverage container of FIG. 3 in an assembled "closed" position.

FIG. 6 is a simplified cross-sectional side view showing a portion of multi-chambered beverage container 300 in a closed position. In particular, FIG. 6 shows the upper portion of container body 310 and ball member 340 when ball member 440 is rotated such that a portion of spherical wall 342 blocks opening 318, thereby preventing liquid from leaking between central chamber 315 of container body 310 and powder chamber 345 of ball member 340. Similar to conventional beverage container 100 (discussed above), when housing is screwed onto body 310, housing 330 presses ball member 340 against O-ring 360 due to the engagement of threads 319 and 333.

According to an aspect of the present invention, the structure including groove 314 and collared O-ring 360 provides a two-part seal that prevents leakage caused by molding flaws in conventional multi-chambered beverage container 100. In particular, base 362 of O-ring 360, which is seated in groove 314, provides a relatively stiff outer seal section that requires a relatively large pressure to significantly deform, similar to conventional "donut-shaped" O-rings. Conversely, collar 366, which extends from base 362 outside of groove 314 (i.e., is relatively unconstrained), provides a relatively soft outer seal section that deforms significantly in response to a relatively small pressure. Accordingly, when ball member 340 is placed over opening 318 and housing 330 is screwed toward container body 310 such that ball member 340 is pressed against O-ring 360 with a relatively small pressure, collar 366 easily deforms to provide a first seal. Subsequent turning of housing 330 relative to container body 310 would increase the pressure exerted by ball member 340 against O-ring 360. This relatively large pressure forces ball member 340 against the relatively stiff section located at the upper portion of base 362. Accordingly, a two-part seal is established in that, even if fluid were to leak past the first "soft" seal provided by collar 366, the fluid would also have to pass the second "hard" seal provided by base 362 in order to enter ball member 340.

As mentioned above, low cost plastic molding techniques often produce parts having slight flaws (i.e., variations from specified part dimensions) that can result in leakage when conventional O-rings are used. According to another aspect of the present invention, collared O-ring 360 avoids these leakage situations as well, as illustrated in the following examples.

Figure 7A:
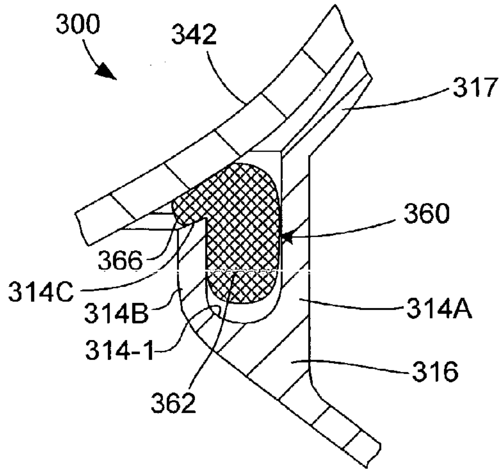
FIGS. 7(A) and 7(B) are enlarged cross-sectional views showing regions of the multi-chambered beverage container including minor molding flaws.
Figure 7B:
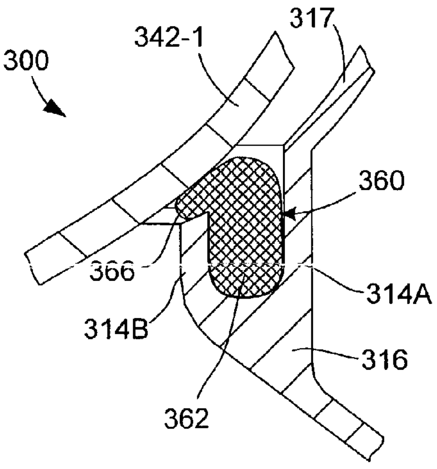

FIGS. 7(A) and 7(B) are enlarged cross-sectional views showing a region of container 300 including a portion of neck 316 and O-ring 360. As indicated in FIG. 7(A), when groove 314 is erroneously formed too deep, contact between collar 366 and an upper surface 314C of inner wall 314B prevents base 362 of O-ring 360 from being inserted too deeply into groove 314, thereby maintaining contact between O-ring 360 and wall 342 of ball member 340. Alternatively, when, for example, ball member 340 is slightly smaller than specified and is shifted inward from flange 317, the large, soft surface area provided by collar 366 maintains contact with wall 342, thereby successfully sealing the central chamber from powder chamber 345 of ball member 340 in the event of this minor molding flaw that would otherwise cause leakage using conventional O-ring arrangements. It will be understood by those familiar with plastic molding techniques that the collared O-ring arrangement of the present invention will similarly prevent leaks due to many other minor molding flaws. Accordingly, the collared O-ring structure of the present invention avoids the leakage problems associated with such minor molding flaws, thereby increasing manufacturing yields and reducing manufacturing costs.

In addition to the specific embodiments disclosed herein, other containers incorporating the various aspects of the present invention are also possible. For example, the cooling element and/or mixing fixture of conventional container 100 and removable bottom plate may be incorporated into a beverage container utilizing the novel structure disclosed herein. Further, the spherical ball member may be replaced with a cylindrical or other curved hollow member.

Moreover, although the present invention has been described with reference to beverage containers used for mixing a liquid and nutritional or dietary powdered substances, an apparatus incorporating one or more of the aspects according to the present invention may be modified to store any substances that require mixing before use, or a valve-like structure requiring the passage of liquid from a body through a hollow valve member. In view of the modifications mentioned above and other possible modifications that fall within the spirit and scope of the present invention, the invention is limited only by the following claims.

The invention claimed is:

1. A multi-chambered container comprising:

a container body for storing a first substance, the container body having a neck defining an annular groove and surrounding a first opening;

a hollow member for storing a second substance, the hollow member including a curved wall and defining a second opening and a selectively sealable third opening; and a collared O-ring having an annular base mounted in the groove and a ring-shaped collar extending from the base outside of the groove and toward the first opening;

wherein the curved wall of the hollow member is moveable between a first position in which a portion of the curved wall is pressed against the collared O-ring and disposed to block the first opening such that the first stored substance is separated from the second stored substance, and a second position in which the first opening aligns with the second opening to form a passage between the interior of the bottle and the interior of the hollow member such that said first substance forms a mixture with said second substance.

2. The multi-chambered container according to claim 1, wherein the collared O-ring comprises a soft, flexible, impermeable material.

3. The multi-chambered container according to claim 2, wherein the soft, flexible, impermeable material comprises silicone.

4. The multi-chambered container according to claim 1, wherein the hollow member comprises a spherical portion and a cylindrical portion extending from the spherical portion.

5. The multi-chambered container according to claim 1, further comprising a housing defining an interior portion, wherein the hollow member is rotatably disposed in the interior portion when the housing is loosely connected the bottle, and wherein the hollow member is fixedly disposed in the interior portion when the housing is tightly connected to the bottle.

6. The multi-chambered container according to claim 1, wherein the container body includes a lower opening communicating with the central chamber, and wherein the multi-chambered container further comprises:

a lower cap assembly detachably connected over the first opening of the body, the lower cap assembly including:

a disk-shaped cover plate; and an elongated cooling element having a first end connected to a central portion of the disk-shaped cover plate and a second end extending perpendicular to the disk-shaped cover plate, wherein the elongated cooling element extends into a central portion of the body such that the elongated cooling chamber is surrounded by the liquid stored in the body, and wherein an interior chamber of the cooling element is filled with a coolant.

7. The multi-chambered container according to claim 1, wherein the container body includes a lower opening communicating with the central chamber, and wherein the multi-chambered container further comprises:

a lower cap assembly detachably connected over the first opening of the body, the lower cap assembly including:

a disk-shaped cover plate;

an elongated element having a first end connected to a central portion of the disk-shaped cover plate and a second end extending perpendicular to the disk-shaped cover plate; and a mixing fixture attached to the second end of the elongated element, wherein the elongated element extends into the body such that the mixing fixture is maintained at a central portion of the central chamber.

8. A multi-chambered container comprising:

a container body for storing a first substance, the container body having a neck defining an annular groove and surrounding a first opening;

a hollow member for storing a second substance, the hollow member including a curved wall and defining a second opening and a selectively sealable third opening; and a collared O-ring having an annular base mounted in the groove and a ring-shaped collar extending from the base outside of the groove and toward the first opening;

means for adjustably securing the hollow member to the container body such that a portion of the hollow member contacts the collared O-ring;

wherein the hollow member is slidable relative to the flange between a first position, in which a portion of the wall is disposed to block the first opening, and a second position in which the first and second openings align to define a passage between an interior of the bottle and an interior of the hollow member.

9. The multi-chambered container according to claim 8, wherein the collared O-ring comprises a soft, flexible, impermeable material.

10. The multi-chambered container according to claim 9, wherein the soft, flexible, impermeable material comprises silicone.

11. The multi-chambered container according to claim 8, wherein the hollow member comprises a spherical portion and a cylindrical portion extending from the spherical portion.

12. The multi-chambered container according to claim 8, further comprising a housing defining an interior portion, wherein the hollow member is rotatably disposed in the interior portion when the housing is loosely connected the bottle, and wherein the hollow member is fixedly disposed in the interior portion when the housing is tightly connected to the bottle.

13. The multi-chambered container according to claim 8, wherein the container body includes a lower opening communicating with the central chamber, and wherein the multi-chambered container further comprises:

a lower cap assembly detachably connected over the first opening of the body, the lower cap assembly including:

a disk-shaped cover plate; and an elongated cooling element having a first end connected to a central portion of the disk-shaped cover plate and a second end extending perpendicular to the disk-shaped cover plate, wherein the elongated cooling element extends into a central portion of the body such that the elongated cooling chamber is surrounded by the liquid stored in the body, and wherein an interior chamber of the cooling element is filled with a coolant.

14. The multi-chambered container according to claim 8, wherein the container body includes a lower opening communicating with the central chamber, and wherein the multi-chambered container further comprises:

a lower cap assembly detachably connected over the first opening of the body, the lower cap assembly including:

a disk-shaped cover plate;

an elongated element having a first end connected to a central portion of the disk-shaped cover plate and a second end extending perpendicular to the disk-shaped cover plate; and a mixing fixture attached to the second end of the elongated element, wherein the elongated element extends into the body such that the mixing fixture is maintained at a central portion of the central chamber.

15. An apparatus comprising:

a body having an annular groove surrounding a first opening;

a hollow valve member including a curved wall and defining a second opening, wherein the curved wall of the hollow valve member is moveable between a first position in which a portion of the curved wall blocks the first opening, and a second position in which the first opening aligns with the second opening to form a passage between the body and the hollow valve member; and a collared O-ring including an annular base mounted in the groove, and a ring-shaped collar extending from the base outside of the groove and toward the first opening, wherein the hollow member is biased against the collared O-ring such that the ring-shaped collar forms an annular seal.

16. The apparatus according to claim 15, wherein the collared O-ring comprises a soft, flexible, impermeable material.

17. The apparatus according to claim 16, wherein the soft, flexible, impermeable material comprises silicone.

* * * * *